INVENTOR
HIROSHI IHARA
BY
OSTROLENK, FABER, GERB & SOFFEN
ATTORNEYS

INVENTOR.
HIROSHI IHARA
BY
OSTROLENK, FABER, GERB & SOFFEN
ATTORNEYS 3,404,385

SYSTEM FOR INTERROGATING AND DETECTING THE CONTENTS OF AN ASSOCIATIVE MEMORY DEVICE

Hiroshi Ihara, Tokyo, Japan, assignor to Nippon Electric Company Limited, Tokyo, Japan Filed Jan. 23, 1964, Ser. No. 339,785
Claims priority, application Japan, Jan. 29, 1963, 38/3,979
10 Claims. (Cl. 340—174)

ABSTRACT OF THE DISCLOSURE

A memory system of the content addressed type in which words stored in memory are interrogated by a word external to memory to determine the presence or absence of coincidence. The memory system is comprised of at least one matrix having conventional means for writing in data words. Interrogation is performed by the application of interrogation pulses whose polarity represent binary ONE or binary ZERO states respectively, to the corresponding bit position of every word in the matrix. Detection circuits coupled in common to all corresponding words develop a read-out pulse in the absence of coincidence. Additional storage means may be provided for identifying the address or location of each word in memory and the presence or absence of coincidence for each word. By interrogating each of the multiple matrices sequentially a single group of detection means may be employed and time-shared by the entire memory to greatly reduce the circuitry necessary for providing a content addressed capability.

The instant invention relates to memory systems and more particularly to memory systems for use in digital computers, data processors and the like, wherein data stored in the memory system is called out of memory in such a way that the data is compared against data words arranged in a facility exterior of the memory system with the memory system providing signals to indicate either comparison or lack of comparison as between data words in memory and the data words exterior of memory.

Present day memory systems are of the Physically Addressed type which are characterized by specifying the address or location of data words in memory in order to retrieve the contents of the memory. However, in the Content Addressed system the information stored therein is read out through specifying a portion or the entire content of information stored therein. This type of system has been designated as the "Associative Memory" system.

In such content addressed memory systems it is necessary to provide a circuit to detect whether there is any information stored within the system which coincides with interrogation information which specifies the portion, or whole, of the information words and further to know where this information is located. Generally speaking, it is exceedingly difficult to perform this operation through the use of memory elements due to the relatively small signal levels which are obtainable from memory elements.

Present day interrogating and detecting systems therefore become complicated and hence very costly since they must be provided with a set of detecting circuits for every address in the memory system.

The instant invention has the feature of dividing all addresses of the memory into appropriate numbers of groups, which groups utilize the detecting circuits in common with each group being interrogated in a sequential manner.

The instant invention is comprised of a regular two-dimensional matrix having magnetic core elements arranged in regular rows and columns with the magnetic cores comprising the matrix being chosen so as to exhibit substantially square hysteresis loop characteristics. While the squareness of the characteristics is not extremely critical, the square hysteresis loop characteristics are nevertheless preferred to provide a suitably operating device.

Each row of magnetic core elements is threaded by row, or sense, windings and each column of magnetic core elements is threaded by an associated column or word winding. The arrangement of the matrix is such that memory elements in each column comprise one memory word. For example, in a four-column by three row matrix, this arrangement thereby consists of four words with each word having a three-bit length. The writing in of information into the memory may be performed in the normal half-current manner wherein the selected columnar winding and row winding are each pulsed with a half-current pulse so as to write in a binary condition at the point where the selected columnar and row windings intersect.

In order to provide the objectives of the instant invention, the above described matrix arrangement has added to it a second set of row windings threading each row of magnetic core elements and a second set of columnar windings threading each associated column of magnetic elements. In order to interrogate the memory by means of exterior located binary words, the bits of each exterior binary word are converted into interrogation pulses wherein binary one states are converted into a positive interrogation pulse and binary zero data bits are converted into negative interrogation pulses (or vice versa). The interrogation pulses are then generated by suitable interrogating circuits such that these pulses may be impressed either simultaneously or sequentially upon the row conductors of the matrix. Each of the second columnar windings are provided with suitable detecting circuits which generate an output pulse in the case where the exterior located data word does not coincide with the data words in memory. In cases where a plurality of regular row and columnar matrices are employed in the memory system each of the row windings are provided with suitable interrogating circuits while each of the columnar windings of each matrix shares the detection circuits of the first matrix so that regardless of the number of row by column matrices employed in the memory system only one system of detection circuits is required for the entire system thereby resulting in a substantial saving in memory circuitry.

The outputs of the detection circuits may be temporarily stored in suitable flip-flop circuits with a flip-flop circuit being associated with each of said detection circuits. As an alternative embodiment, a plurality of groups of flip-flop circuits may be provided with each group of flip-flop circuits being associated with the column windings of each matrix with a sufficient number of groups of flip-flop circuits being provided for each matrix in the memory system. In this manner all of the data words in memory interrogated are provided with an associated flip-flop containing a binary state indicative of the coincidence or lack of coincidence existing between all of the words in memory and the exterior word which has interrogated the memory.

It is therefore one object of the instant invention to provide a novel memory storage system of the content addressed type for use in computers, data processors and the like which is designed to provide an indication of coincidence or lack of coincidence between a word located exterior to the memory and all of the data words stored in the memory.

Another object of the instant invention is to provide a novel memory system of the content addressed type in which all or a large portion of the data words stored in memory are compared against a data word located exterior to the memory in which one set of detection circuits may be shared in common by all of the matrices within the memory system.

Still another object of the instant invention is to provide a novel memory system of the content addressed type for use in computers, data processors and the like in which storage means associated with each word in memory is provided for storing the result of the interrogation operation which compares all the data words stored in memory against the data words, or words, located exterior to the memory as well as establishing the location of all data words in the memory which do not coincide with the data word located exterior of the memory.

These and other objects of the instant invention will become apparent when reading the accompanying description and drawings in which.

As previously mentioned, it is necessary to have circuit means to detect whether information stored in memory coincides with the interrogation information as well as to provide means for identifying the address or location of such words which are in coincidence. This is presently quite difficult in the use of memory elements due to the small signal levels obtained from such elements. Present day interrogating and detecting systems are of a complicated nature in that they are provided with a set of detecting circuits for every address provided in memory. A significant feature of the present invention is that all addresses of the memory are divided into a proper number of groups and that one set of detecting circuits is employed in common for all these groups with the groups being interrogated in a sequential manner.

In general, if the interrogation information exterior of memory, the stored information in memory and the signal to be detected be identified as Q, C, and D respectively, then $$D=QC+\overline{Q}\overline{C} \quad (1)$$

An interpretation of the above equation is that a detection signal will be generated when the interrogation binary bit and memory stored bit are both simultaneously either binary one or binary zero. This logical operation is performed by means of the memory drive system coupled with the conductor arrangement in a manner to be more fully described.

As an alternative approach, which nevertheless will provide the same result and which is of a simpler design, it will be assumed for the purposes of the instant invention that the system described herein provides a pulse voltage output as the detecting signal if the condition of Equation 1 is not satisfied and gives no pulse voltage if the equation is satisfied when an interrogation pulse is impressed upon memory.

Figure 1:
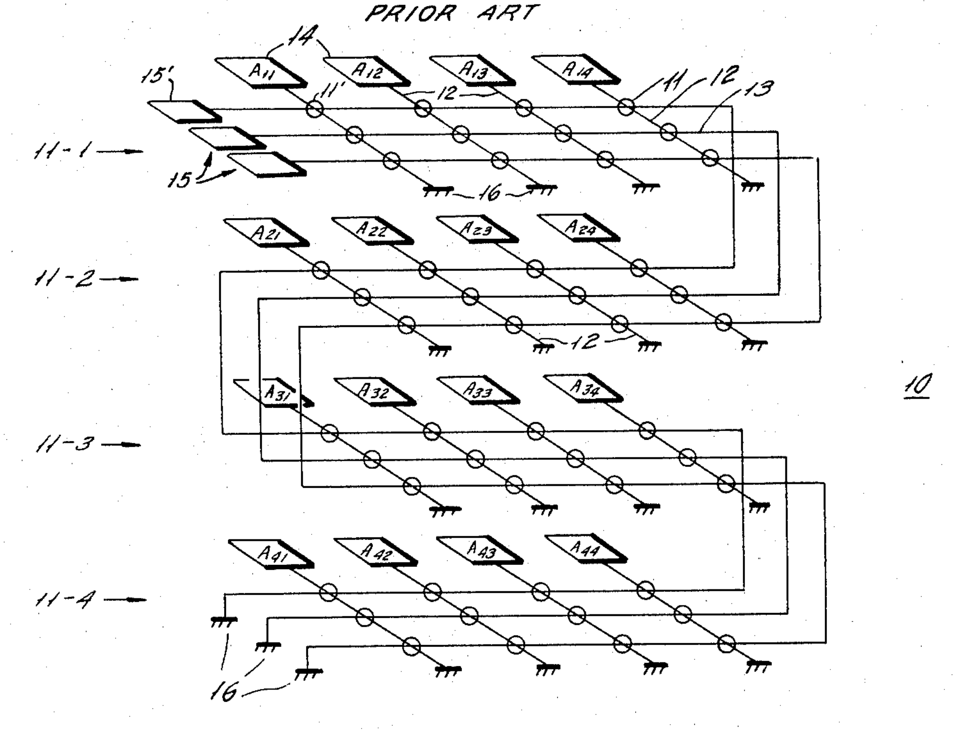
FIG. 1 PRIOR ART
FIGURE 1 is a schematic diagram showing a typical two-dimensional memory.

FIGURE 1 shows a memory matrix 10 comprised of a plurality of magnetic cores 11 arranged in regular rows and columns so as to form the four matrix groups 11–1 through 11–4. Each column of the four matrices is comprised of three memory elements 11 while each row is comprised of four memory elements. The arrangement 10 of FIGURE 1 shows a 16 word memory with each word being comprised of three binary bits. Thus, each column represents a three-bit word, there being 16 such three-bit columns in the four matrices 11–1 through 11–4. Each column is provided with a columnar or word drive conductor or winding 12 while each row is provided with a digit drive and sense conductor or winding 13. As can be seen from the figure, each row or digit drive and sense conductor winding 13 is connected in series with the equivalent row winding of the three remaining matrices. A word drive circuit 14 is connected to an associated columnar winding 12 in the manner shown in the figure. The word conductors 14 are divided into four groups and these groups are assigned the memory address designations: [A11, A12, A13, A14]; [A21, A22, A23, A24]; [A31, A32, A33, A34]; and [A41, A42, A43, A44]. A digit drive and sense amplifier circuit 15 is connected to an associated row winding 13 in the manner shown. All of the row and column windings 12 and 13 are terminated at their opposite ends to ground potential 16 in the manner shown. The arrangement of FIGURE 1 is the publicly known two-dimensional matrix and its operating principles which are typically known as the half-current coincidence current operation is omitted here since this operation is well known in the prior art.

Figure 2:
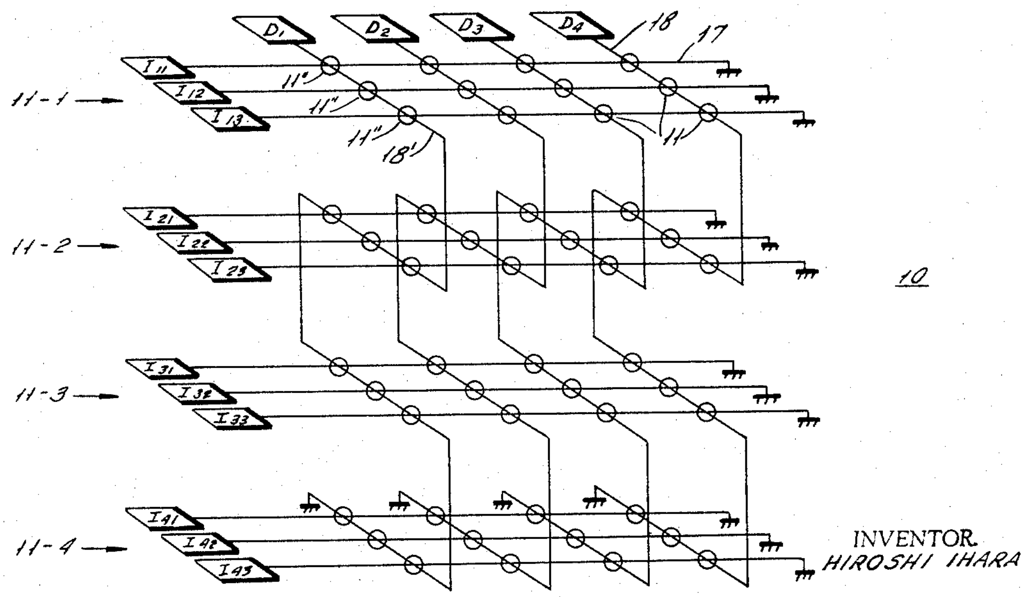
FIGURE 2 is a schematic diagram showing a two-dimensional memory system which when added to the arrangement of FIGURE 1 performs the functions of the instant invention.

FIGURE 2 shows the memory system 10 with the magnetic cores 11 being arranged in regular row and column fashion in the same manner as shown in FIGURE 1 with the additional winding and drive circuits which are added to the arrangement of FIGURE 1 for the purpose of achieving the objectives of the instant invention. Each of the matrices 11–1 through 11–4 are provided with second row windings 17 which are identified as interrogation conductors which are arranged to thread the magnetic elements of each associated row. Each of the interrogation conductors 17 extend independently to each group of addresses [A11, . . . A14]; [A21, . . . A24]; . . [A41, . . . A44]. The interrogation conductors 17 of FIGURE 2 are arranged in parallel to the first set of row windings 13.

The second set of conductors 18 to be added to the memory 10 are identified as detecting conductors which are arranged to thread the magnetic elements of each column. Conductors 18 are arranged in parallel to the conductors 12 of FIGURE 1. The corresponding detecting conductors 18 of each matrix 11–1 through 11–4 may be connected either in series or in parallel or by means of other electrical methods and then connected in turn to the detecting amplifier circuits $D_1$, $D_2$, $D_3$ and $D_4$, respectively. With the arrangement of FIGURE 2, it can be seen that the detecting conductors 18 of each matrix 11–1 through 11–4 are connected in a series relationship, but a parallel or any other type of relationship may be employed without departing from the concepts of the instant invention. Attached to each interrogation drive windings 17 is an associated drive circuit $I_{11}$–$I_{43}$, respectively.

Before considering the operation of the memory system of the instant invention, it should be clearly understood that the first step in the use of the memory system 10 is that of writing in the binary data in the form of three-bit words to be stored in memory. This operation may be performed by the digit drive and word drive circuits 15 and 14, respectively. For example, by generating current pulses of half-current magnitude in the digit drive circuit 15' and the word drive circuit $A_{11}$, this will effect the saturation state of the magnetic core 11' while having no effect whatsoever on the remaining cores of the memory system 10 although the other cores of the memory system 10 may be appropriately set as to its saturation state in a similar manner.

In order to interrogate the memory system 10, interrogation pulse currents are generated by the interrogation driving circuits when the interrogation information is presented to the driving circuits $I_{11}$–$I_{43}$, respectively. The polarity of the current pulse generated by the interrogation driving circuits $I_{11}$–$I_{43}$ is either positive or negative, depending upon the binary state of the interrogating information. The magnetic cores threaded by each interrogating conductor 17 are activated by these interrogating pulses and produce voltage pulses in each detecting amplifier circuits $D_1$–$D_4$ only when the condition of Equation 1 is not satisfied. The detecting amplifier circuits $D_1$–$D_4$ have the further functions of detecting the voltage pulse and then performing amplification and shaping operations to generate suitable output pulses.

The instant invention is characterized by the fact that the interrogation driving circuits $I_{11}$–$I_{43}$ are not activated simultaneously, but are activated in a sequential fashion maintaining a definite time interval between the interrogation of successive interrogation driving circuits in accordance with the following sequence:

The first group $I_{11}$, $I_{12}$ and $I_{13}$ of interrogation driving circuits which are associated with the address group [$A_{11}$–$A_{14}$] are first activated either sequentially or simultaneously. Subsequent thereto, the interrogation drive circuits $I_{21}$, $I_{22}$ and $I_{23}$ belonging to the address group [$A_{21}$–$A_{24}$] are then activated either simultaneously or successively a predetermined delay period after the activation of the interrogation drive circuits $I_{11}$–$I_{13}$. In this manner the operation continues through the address groups [$A_{31}$–$A_{34}$] and [$A_{41}$–$A_{44}$] in order to complete the interrogation operation.

As one example, considering FIGURE 2, let it be assumed that the memory core elements 11″ which make up the digit word associated with the detecting circuit $D_1$ stores the binary condition 111. Let it further be assumed that the interrogation word to be introduced into the interrogation driving circuits $I_{11}$–$I_{13}$ is also the binary word 111. With each of these interrogation driving circuits $I_{11}$–$I_{13}$ generating a current pulse representative of the binary one condition and with the magnetic cores 11″ all being in the binary one saturation state, no detection pulses will be induced into the detection winding 18′ and hence the detecting circuit $D_1$ will not generate any output pulses indicative of the fact that the memory word position of the magnetic cores 11″ stores a data word identical to the interrogation word which is exterior of memory and which is being employed to interrogate the memory system 10. The remaining detection circuits $D_2$–$D_4$ operate in a like manner as a consequence of the current pulses being generated by the interrogating circuits $I_{11}$–$I_{13}$. The operation then steps in a sequential fashion to the interrogating circuits of the matrices 11–2 through 11–4 with the operation being performed in a manner similar to that described above. Thus, the interrogation amplifying circuits $D_1$–$D_4$ receive first the interrogation results dealing with the addresses $A_{11}$–$A_{14}$, respectively. Subsequent thereto, the detection circuits receive the interrogation results regarding the addresses $A_{21}$–$A_{24}$, respectively, and so on for the addresses $A_{31}$–$A_{34}$ and $A_{41}$–$A_{44}$.

Figure 3:
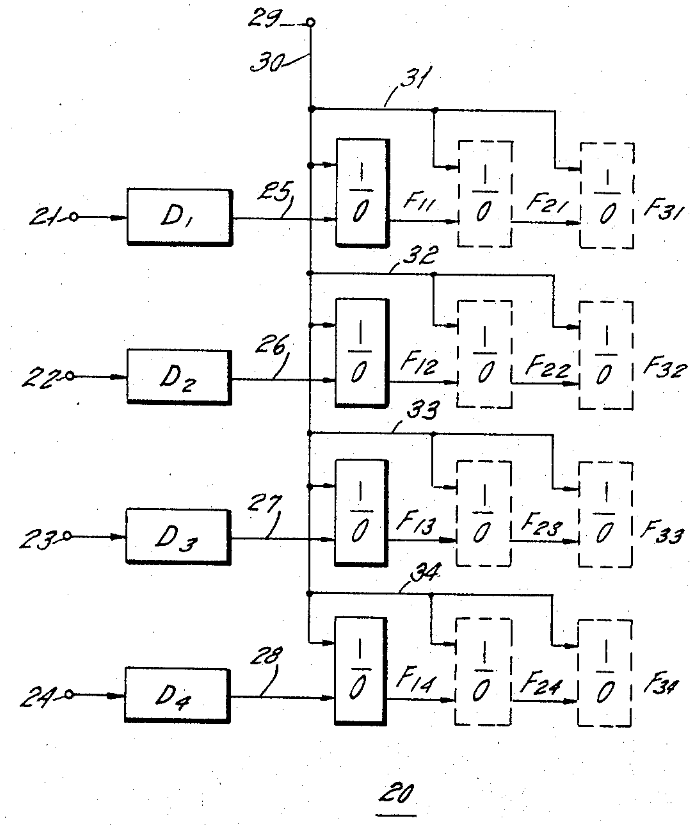
FIGURE 3 is a block diagram showing one example of a storage circuit which may be employed to store the results of the detection operations performed by the memory system of FIGURES 1 and 2.

In order to indefinitely store the address locations at which stored information is present which satisfied the Equation 1, the circuit 20 of FIGURE 3 may be employed. In the arrangement 20 of FIGURE 3 the terminals 21, 22, 23 and 24 represent the points at which the detection circuits $D_1$–$D_4$, respectively, are connected to the associated detecting windings 18 shown in FIGURE 2. The output signals, or detection signals, generated by detection circuits $D_1$–$D_4$ appear at the output terminals 25–28 respectively, of the detection circuits, which output terminals are connected to one input terminal of the bistable flip-flop circuits $F_{11}$–$F_{14}$. The detection circuit output pulses are employed to trigger these flip-flops. Second and third groups of flip-flops $F_{21}$–$F_{24}$ and $F_{31}$–$F_{34}$ are provided for the purpose of storing the address information for the four data words of each of the matrices 11–1 through 11–3, shown in FIGURES 1 and 2. While four matrices are shown in FIGURES 1 and 2, only three such groups of flip-flop circuits are shown in FIGURE 3 for the purpose of simplicity, it being understood that a fourth such group of flip-flops may be provided in order to store the information for the fourth matrix 11–4.

The output terminals of the flip-flops $F_{11}$–$F_{14}$ are connected respectively, to the associated input terminal of the flip-flops $F_{21}$–$F_{24}$ and in turn the output terminals of these flip-flops are connected to one input terminal of the flip-flop group $F_{31}$–$F_{34}$, respectively. Reset pulses are provided at the terminal 29 of common bus 30, which in turn has branches 31–34 respectively, in order to reset all of the flip-flops $F_{11}$–$F_{34}$.

The operation of the circuit of FIGURE 3 is as follows:

Initially, all of the flip-flops $F_{11}$–$F_{34}$ are reset to the zero state by placing an appropriate trigger pulse at the reset input terminal 29. This simultaneously imposes the reset pulse upon the reset input terminals of all of the flip-flops $F_{11}$–$F_{34}$. The next step is that of interrogating the interrogation circuits $I_{11}$–$I_{13}$ with an external data word. These pulses cause the detector circuits $D_1$–$D_4$ to either generate a pulse indicative of the fact that the three-bit data word associated with that detector circuit fails to coincide with the interrogation word or alternatively fails to generate an output pulse to indicate that the word associated with that detection circuit does coincide with the external data word performing the interrogation operation. In the case where there is a lack of coincidence between the external word and any of the four words first being interrogated, any one or all of the detection circuits $D_1$–$D_4$ will generate a pulse indicative of this condition, which pulse will be impressed upon its associated flip-flop $F_{11}$–$F_{14}$. Immediately after this condition is impressed upon the first set of flip-flops another trigger pulse is imposed upon the reset input terminal 29 causing flip-flops $F_{11}$–$F_{14}$ to be reset and shifting the information stored therein to the flip-flop circuits $F_{21}$–$F_{24}$ respectively. Next the interrogation circuits $I_{21}$–$I_{23}$ are activated, causing either a pulse or no pulse condition to be generated in the detector circuits $D_1$–$D_4$. These voltage pulses are then imposed upon the first set of flip-flop circuits $F_{11}$–$F_{14}$. At this phase flop-flops $F_{21}$–$F_{24}$ contain the state of the data words of matrix 11–1 as they relate to the exterior interrogation word while the flip-flop circuits $F_{11}$–$F_{14}$ contain the coincidence state as between the data word stored in matrix 11–2 and the exterior interrogation word.

Another trigger pulse is then impressed upon restt terminal 29 causing the states of flip-flops $F_{21}$–$F_{24}$ to be transferred to the flip-flop circuits $F_{31}$–$F_{34}$ respectively, and also causing the states of flip-flops $F_{11}$–$F_{14}$ to be transferred to flip-flop circuits $F_{21}$–$F_{24}$, respectively. Flip-flops $F_{11}$–$F_{14}$ now being cleared are ready to receive the coincidence relationships between the data words of matrices 11–3 and the exterior interrogating word with the interrogation of the matrix 11–3 being the same as previously described with respect to matrices 11–1 and 11–2. By providing still another stage of flip-flops, still a third transfer operation may be performed so as to provide means for storing the coincidence relationship between all 16 data words stored in memory system 10 and their relationships with the interrogation word imposed upon memory from a location exterior thereto. Thus, by an examination of the states of flip-flops $F_{11}$–$F_{34}$, it can immediately be established as to which data words coincide with the exterior interrogation word and also as to the location of the data words which so coincide. Conversely, it can also be established as to which data words do not coincide with the exterior interrogation word and the location of these data words as well.

The system of FIGURES 1–3 described herein may be enlarged so as to encompass all of the matrices in a large memory system, or the memory may be divided into sections with each section being designed in a manner similar to that shown in FIGURES 1–3 and with each section being interrogated simultaneously or sequentially one after the other with the interrogation operation being identical to that described above. By so dividing the total memory system into a plurality of sections, it is possible to still further reduce the number of detecting amplifiers which are needed to amplify very small signals so that their design can be more elaborate if desired while at the same time substantially reducing the total number of detection circuits needed in order to interrogate the memory.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A system having memory means and means for detecting the contents of said memory means; said memory means comprising a plurality of magnetic memory elements, equal numbers of said elements forming binary word groups; a predetermined number of said word groups each forming an address group; half-current coincidence means for writing binary information into said groups; each address group comprising a plurality of interrogation conductor means; each of said interrogation conductor means threading one associated memory element of each binary word group; a plurality of detecting conductor means; each of said detecting conductor means threading all the memory elements of a binary word group; all of said detecting conductor means occupying the same position in each address group being connected in series; interrogation circuit means for sequentially driving the interrogation winding means of each address group in sequential fashion; detection circuit means connected to the detecting conductor means of one address group for generating the detecting signals of all of said address groups connected in series therewith.

2. The system of claim 1 wherein said memory elements are magnetic cores exhibiting substantially square-loop hysteresis characteristics.

3. A content-addressed memory system defined as claim 2, in which the detecting conductors of corresponding columns of said groups are connected in series fashion.

4. A content-addressed memory system defined as claim 2, in which the detecting conductors of corresponding columns of said groups are connected in parallel.

5. A content-addressed memory system of the type defined in claim 2 in which said interrogating circuits are driven in sequential fashoin by each group of memory elements.

6. A content-addressed memory system of the type defined in claim 2 in which said interrogating circuits are driven sequentially by each row of said groups.

7. A content-addressed memory system defined in claim 2 in which said memory elements are magnetic cores exhibiting substantially square-loop hysteresis characteristics.

8. A system having memory means and means for detecting the coincidence of the contents of said memory means with an external word, said memory means comprising a plurality of matrices; each of said matrices comprising a plurality of memory elements arranged in a plurality of regular rows and columns; half-current coincidence means for writing binary information into said groups; a plurality of groups of interrogating conductor means; each of said groups associated with one of said matrices; the interrogating conductor means in each group each being electrically coupled to the memory elements in an associated row of the matrix; a plurality of detecting conductor means; each of said detecting conductor means coupled to an associated column of all of said matrices; detecting circuit means connected to each of said detecting conductor means; interrogation circuit means for each of said matrices for generating interrogation pulses in each matrix in sequential fashion enabling said detecting circuit means to store an indication of the coincidence of the contents of each of said matrices with the external word.

9. The system of claim 8 wherein said memory elements are magnetic cores exhibiting substantially square-loop hysteresis characteristics.

10. A content-addressed memory system for determining the coincidence between the memory contents and an external word, comprising: a memory matrix comprised of a plurality of memory elements arranged in groups of rows and columns; half-current coincident means for writing binary words into said columns; a plurality of detecting conductors each being associated with a corresponding column of said groups and being electrically coupled to all memory elements of each column groups; a plurality of interrogating conductors each being associated with one row of each of said groups; a plurality of detecting circuits each being connected to an associated column conductor; a plurality of interrogating circuits each being connected to an associated row conductor; said interrogating circuits including means for driving said row conductors with positive and negative pulse corresponding to the binary information of the external word, said detecting circuits being adapted to amplify and reshape the detecting signals induced on said detecting conductors when stored information in said memory elements are compared with said external binary information by said interrogating circuits.

References Cited

UNITED STATES PATENTS 3,319,233 5/1967 Amemiya ---------- 340—174
3,339,181 8/1967 Singleton ---------- 340—174

TERRELL W. FEARS, *Primary Examiner.*